United States Patent
Hoo

(10) Patent No.: US 8,495,133 B2
(45) Date of Patent: Jul. 23, 2013

(54) INTERACTIVE INFORMATION SYSTEM, INTERACTIVE INFORMATION METHOD, AND COMPUTER READABLE MEDIUM THEREOF

(75) Inventor: Ming-Yih Hoo, Taipei (TW)

(73) Assignee: Locus Publishing Company, Taipei (TW)

( * ) Notice: Subject to any disclaimer, the term of this patent is extended or adjusted under 35 U.S.C. 154(b) by 417 days.

(21) Appl. No.: 12/838,186

(22) Filed: Jul. 16, 2010

(65) Prior Publication Data

US 2011/0016173 A1    Jan. 20, 2011

Related U.S. Application Data

(60) Provisional application No. 61/298,034, filed on Jan. 25, 2010.

(30) Foreign Application Priority Data

Jul. 17, 2009  (TW) ............................. 98124238 A

(51) Int. Cl.
*G06F 15/16*    (2006.01)

(52) U.S. Cl.
USPC ........... 709/203; 709/230; 709/232; 709/238; 709/245

(58) Field of Classification Search
USPC .......................... 709/203, 230, 232, 238, 245
See application file for complete search history.

(56) References Cited

U.S. PATENT DOCUMENTS

| | | | |
|---|---|---|---|
| 3,670,427 A | 6/1972 | Stolpen | |
| 5,823,782 A | 10/1998 | Marcus et al. | |
| 5,957,692 A | 9/1999 | McCracken et al. | |
| 5,991,693 A | 11/1999 | Zalewski | |
| 6,377,296 B1 * | 4/2002 | Zlatsin et al. | 348/143 |
| 6,659,836 B1 | 12/2003 | Jinushi et al. | |
| 7,029,283 B2 | 4/2006 | Marcus et al. | |
| 7,040,898 B2 | 5/2006 | Marcus et al. | |
| 7,214,066 B2 | 5/2007 | Marcus et al. | |

(Continued)

FOREIGN PATENT DOCUMENTS

| | | |
|---|---|---|
| CN | 1347065 A | 5/2002 |
| CN | 101409020 A | 4/2009 |
| CN | 201345173 Y | 11/2009 |

OTHER PUBLICATIONS

PCT Written Opinion of the International Searching Authority, Nov. 4, 2010.

(Continued)

*Primary Examiner* — Liangche A Wang
(74) *Attorney, Agent, or Firm* — Kilpatrick Townsend & Stockton LLP

(57) ABSTRACT

An interactive information system, an interactive information method, and a computer readable medium thereof are provided. The interactive information system comprises a reading apparatus, a first transmission interface, a processing unit, a second transmission interface, and an output apparatus. The interactive information system is adapted to use with a plurality of information gadgets. When an information gadget enters the reading range of the reading apparatus, the reading apparatus reads the information gadget, generates a signal related to the information gadget, and transmits the signal to the processing unit. Then, the processing unit identifies the information gadget indicated by the signal, retrieves a file according to the information gadget, and transmits the file to the output apparatus. Finally, the output apparatus then outputs the file received from the processing unit.

23 Claims, 11 Drawing Sheets

U.S. PATENT DOCUMENTS

| | | |
|---|---|---|
| D590,442 S | 4/2009 | Jones |
| 8,137,105 B2 | 3/2012 | Chen et al. |
| 2002/0022523 A1* | 2/2002 | Dan et al. .................. 463/42 |
| 2003/0027108 A1 | 2/2003 | Marcus et al. |
| 2004/0063078 A1 | 4/2004 | Marcus et al. |
| 2005/0224573 A1* | 10/2005 | Yoshizane et al. ............ 235/379 |
| 2005/0260547 A1 | 11/2005 | Moody |
| 2007/0190513 A1* | 8/2007 | Ito .................................. 434/350 |
| 2007/0255551 A1 | 11/2007 | Ma |
| 2008/0187891 A1 | 8/2008 | Yang |
| 2009/0092951 A1 | 4/2009 | Hou et al. |
| 2009/0138784 A1* | 5/2009 | Tamura et al. ................ 714/776 |
| 2009/0163175 A1* | 6/2009 | Shi et al. ...................... 455/411 |
| 2010/0227304 A1* | 9/2010 | Horikawa .................... 434/350 |
| 2010/0279752 A1 | 11/2010 | Kim |
| 2011/0015920 A1 | 1/2011 | How |

OTHER PUBLICATIONS

"Chinese Word Building Game," 1986, http://boardgamegeek.com/boardgame/40256/chinese-word-building-game (6 pages).

U.S. Appl. No. 12/692,343, Non-Final Office Action mailed May 22, 2012 (12 pages).

Chinese Patent Application No. CN 201010236526.1, Office Action mailed Aug. 3, 2012 (12 pages).

U.S. Appl. No. 12/692,343, Response to Non-Final Office Action filed Aug. 22, 2012 (14 pages).

U.S. Appl. No. 12/692,343, Final Office Action mailed Oct. 24, 2012 (14 pages).

U.S. Appl. No. 12/692,343, Request for Continued Examination and Response to Final Office Action filed Mar. 25, 2013 (17 pages).

* cited by examiner

INTERACTIVE INFORMATION SYSTEM, INTERACTIVE INFORMATION METHOD, AND COMPUTER READABLE MEDIUM THEREOF

CROSS-REFERENCES TO RELATED APPLICATIONS

This application claims the benefit of priority based on Taiwan Patent Application No 098124238 filed on Jul. 17, 2009, and U.S. Provisional Application Ser. No. 61/298,034 filed on Jan. 25, 2010, the contents of which are incorporated herein by reference in their entirety.

BACKGROUND OF THE INVENTION

1. Field of the Invention

The present invention relates to an interactive information system, an interactive information method, and a computer readable medium thereof. More particularly, the interactive information system, the interactive information method, and the computer readable medium thereof of the present invention read the identification code on information gadgets and output a file corresponding to the information gadget.

2. Descriptions of the Related Art

In conventional learning systems, the manners of providing learning materials are often one-way transmission. It means that it is often the learning system outputs information to a user and the user cannot express his or her thoughts. In this manner, the user can only learn the information from the learning system passively. Furthermore, teaching materials of the conventional learning systems are often monotonous and provide no interaction with users, so users easily get bored with the teaching materials.

Accordingly, there is an urgent need in the art to provide a solution that increases interactivity and interest in information exchange applications.

SUMMARY OF THE INVENTION

An objective of this invention is to provide an interactive information system. The interactive information system comprises a first transmission interface, a storage unit, a processing unit, and a second transmission interface. The processing unit is electrically connected to the first transmission interface, the storage unit, and the second transmission interface. The storage unit stores a database. The first transmission interface is configured to receive a signal. The processing unit is configured to receive the signal from the first transmission interface, to identify an information gadget indicated by the signal, and to retrieve a file according to the information gadget from the database. The second transmission interface is electrically connected to the processing unit and configured to transmit the file.

Another objective of this invention is to provide an interactive information method for use in an interactive information system. The interactive information system comprises a first transmission interface, a storage unit, a processing unit, and a second transmission interface. The storage unit stores a database. The processing unit is electrically connected to the first transmission interface and the storage unit. The second transmission interface is electrically connected to the processing unit. The interactive information method comprises the following steps of: (a) enabling the first transmission interface to receive a signal; (b) enabling the processing unit to receive the signal from the first transmission interface; (c) enabling the processing unit to identify an information gadget indicated by the signal; (d) enabling the processing unit to retrieve a file according to the information gadget from the database; and (e) enabling the second transmission interface to transmit the file.

Yet a further objective of this invention is to provide a computer readable medium. The computer readable medium is stored a program of an interactive information method for being applied in an interactive information system. The interactive information system comprises a first transmission interface, a storage unit, a processing unit, a second transmission interface, and an output apparatus. The storage unit stores a database. The processing unit is electrically connected to the first transmission interface and the storage unit. The second transmission interface is electrically connected to the processing unit. The output apparatus is electrically connected to the second transmission interface. The program comprises a code A, a code B, a code C, a code E, a code F, and a code G. The code A enables the first transmission interface to receive a signal. The code B enables the processing unit to receive the signal from the first transmission interface. The code C enables the processing unit to identify a first information gadget indicated by the signal. The code D enables the processing unit to identify a second information gadget indicated by the signal. The code E enables the processing unit to determine that a number of the information gadgets is greater than one. The code F enables the processing unit to retrieve a file according to the first information gadget from the database. The code G enables the second transmission interface to transmit the file to the output apparatus.

According to the above descriptions, the interactive information system, the interactive information method, and the computer readable medium thereof of the present invention are able to retrieve a file corresponding to the information gadget(s) from the database and to output the file. In this way, the present invention could overcome the drawbacks of the prior art (i.e. the conventional information exchange systems lack interactivity and interest) and increase interactivity and interest in information exchange applications.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides an interactive information system, an interactive information method and a computer readable medium thereof to assist users to learn and/or understand different fields of knowledge. Briefly speaking, the interactive information system may be used with a plurality of information gadgets, and each of the information gadgets is recorded with information of a specific field of knowledge. A user may choose one or some of the information gadgets and show the chosen information gadgets to interactive information system. The interactive information system then functions according to the chosen information gadgets. From the functions performed by the interactive information system, the user can learn the specific field of knowledge from the chosen information gadgets. Consequently, the interactive information system can be used as a learning system. For example, the interactive information system can be used for Chinese learning when the information gadgets are recorded with information of Chinese, for math learning when the information gadgets are recorded with information of math, for games playing when the information gadgets are recorded with information of games, and so on.

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than limitation to the present invention. It should be appreciated that elements unrelated to the present invention are omitted from depiction in the following embodiments and the attached drawings. Dimensional relationships among individual elements in the attached drawings are illustrated only for ease of understanding but not to limit the actual scale.

Figure 1A:
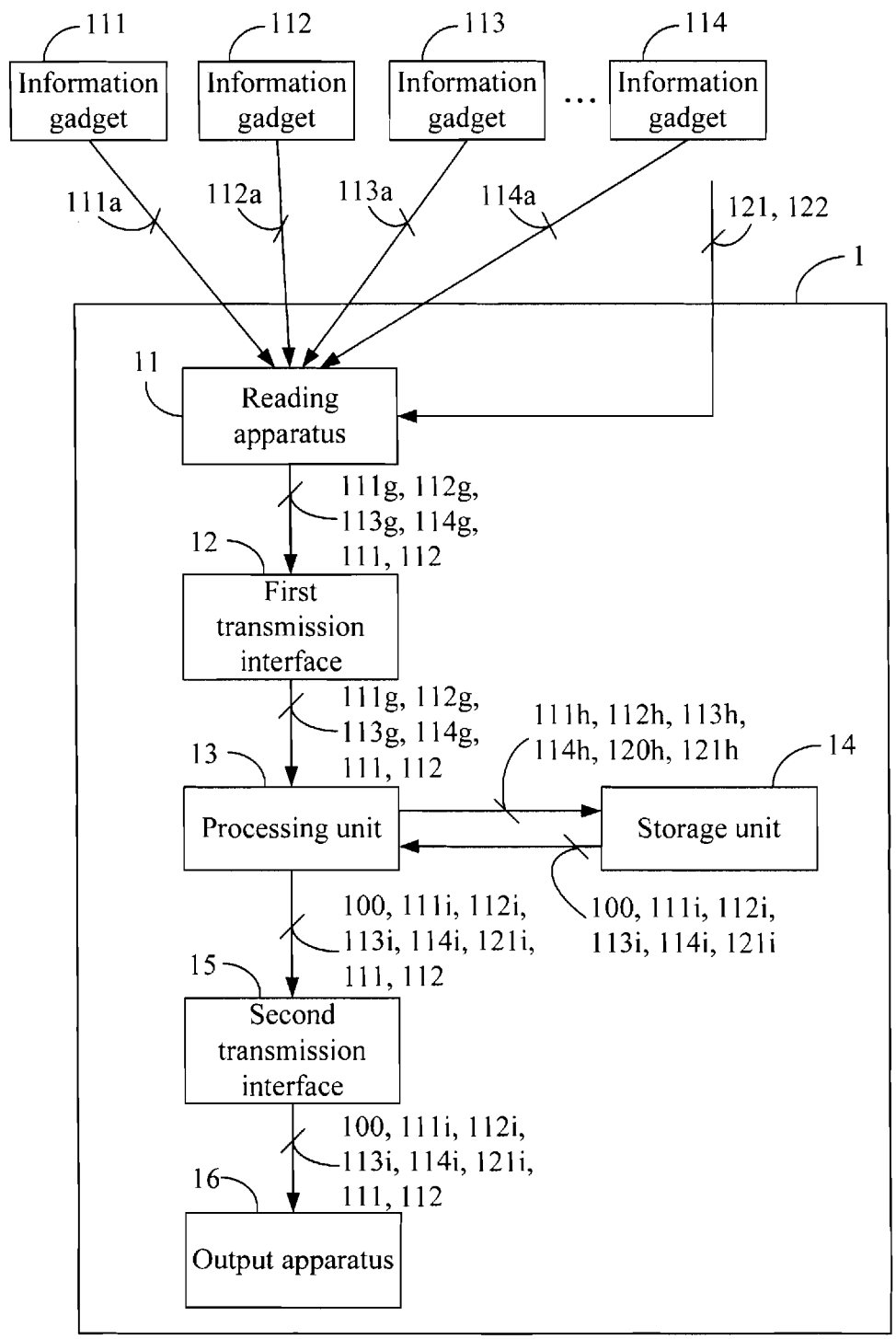
FIG. 1A illustrates a schematic view of a first embodiment of the present invention.

A first embodiment of the present invention is an interactive information system 1, whose schematic view is illustrated in FIG. 1A. The interactive information system 1 comprises a reading apparatus 11, a first transmission interface 12, a processing unit 13, a storage unit 14, a second transmission interface 15, and an output apparatus 16. The processing unit 13 is electrically connected to the reading apparatus 11 via the first transmission interface 12 and is electrically connected to the output apparatus 16 via the second transmission interface 15. The processing unit 13 is electrically connected to the first transmission interface 12, the second transmission interface 15, and the storage unit 14. The storage unit 14 stores a database. FIG. 1A also illustrates a plurality of information gadgets 111, 112, 113, . . . , 114 which are used with the interactive information system 1.

In this embodiment, the interactive information system 1 is a computer, the reading apparatus 11 is a webcam, and the output apparatus 16 comprises a display unit and a speaker; however, these elements may be replaced by other devices in other embodiments. For example, the reading apparatus 11 may be replaced by a barcode reader or other apparatuses capable of reading the identifier of the information gadgets 111, 112, 113, . . . , 114, the interactive information system 1 may be replaced by a mobile phone, a personal digital assistant, or other computing apparatus that are of computer processing ability, and the output apparatus 16 may be replaced by a monitor, an LCD display, headphones, or other apparatus capable of outputting information. In this embodiment, the reading apparatus 11 and the output apparatus 16 are build-in apparatuses of the interactive information system 1; however, in other embodiments, the reading apparatus 11 or the output apparatus 16 may be an external apparatus connected to a computer. It should be appreciated herein that, the present invention is not limited the types of the reading apparatus 11 or the output apparatus 16; the reading apparatus 11 or the output apparatus 16 may also be replaced in other manners by those of ordinary skill in the art depending on practical needs, and this will not be further described herein.

Before going through the details of the interactive information system 1, the information gadgets are introduced. In the present invention, an information gadget can be in any shape; that is, an information gadget may be a cube, a card, etc. An information gadget has an identifier recognizable by an interactive information system, which means that the identifier may be realized as a 2-dimensional (2D) barcode, a radio-frequency identification (RFID) tag, etc. In addition, the information gadget is recorded with content related to a specific field of knowledge, such as Chinese, mathematics, physics, games, etc. Exemplary information gadgets of the present invention are given below for better understanding.

Figure 1B:
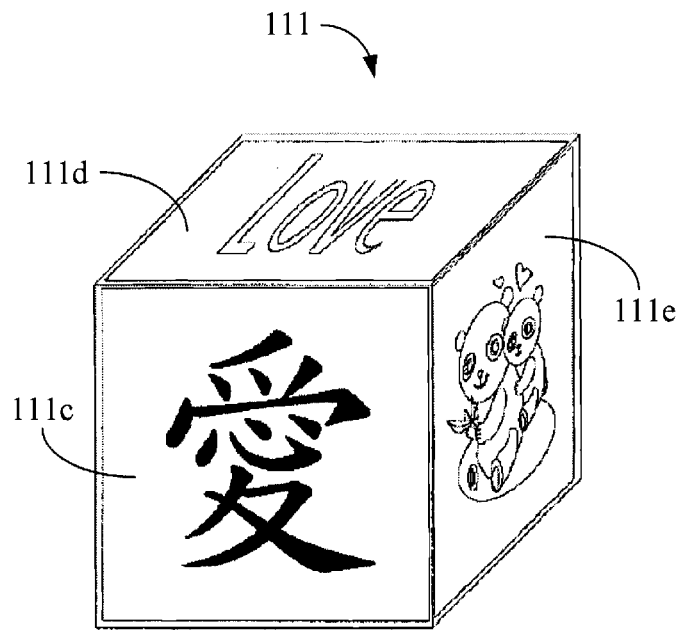
FIGS. 1B and 1C illustrate schematic view of a cubic information gadget.
Figure 1C:
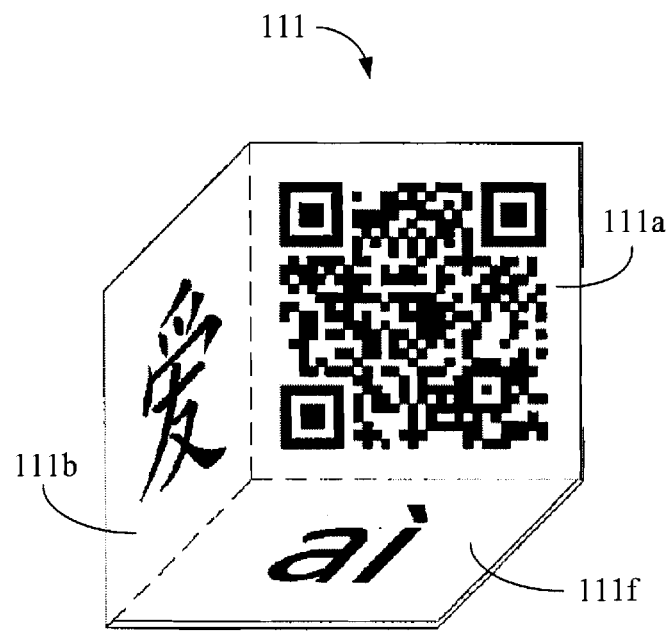
Figure 1F:
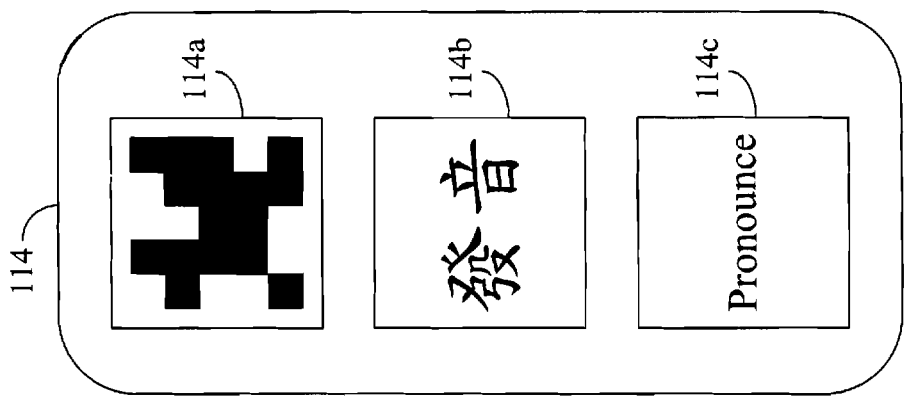
FIGS. 1D, 1E, and 1F individually illustrate schematic view of an information gadget.
Figure 1E:
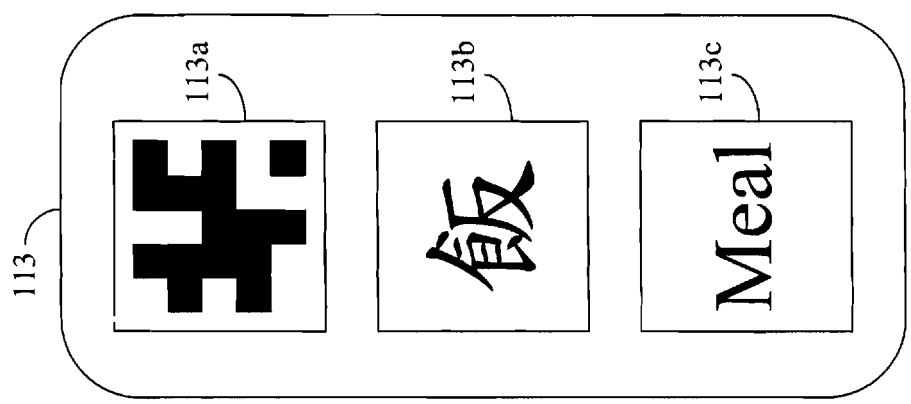
Figure 1D:
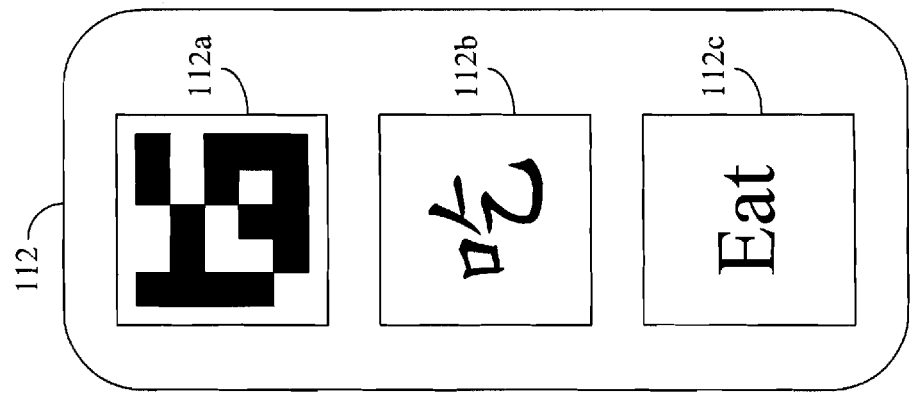

FIGS. 1B and 1C illustrate schematic view of the information gadget 111, which is a cube. The identifier of the information gadget 111 is the 2D barcode 111*a*. The information gadget 111 can be used for Chinese learning because its content is related to Chinese language. Specifically, the content recorded on the information gadget 111 comprises a simplified Chinese character "爱" 111*b*, a traditional Chinese character "愛" 111*c*, an English word "Love" 111*d*, a picture representing love 111*e*, and a phonetic alphabet 111*f*. FIGS. 1D, 1E, and 1F illustrate another three information gadgets 112, 113, 114, which are cards. The information gadget 112 is recorded with a 2D barcode 112*a* representing its identifier, a traditional Chinese character "吃" 112*b*, and an English word "Eat" 112*c*; the information gadget 113 is recorded with a 2D barcode 113*a* representing its identifier, a traditional Chinese character "飯" 113*b*, and an English word "Meal" 113*c*; the information gadget 114 is recorded with a 2D barcode 114*a* representing its identifier, a traditional Chinese phrase "發音" 114*b*, and an English word "pronounce" 114*c*.

In the present invention, an information gadget may be further classified as a functional information gadget or a data information gadget depending on the contents recorded thereon. In particular, in this embodiment if the content recorded on an information gadget corresponds to a piece of information, such as a Chinese character, the information gadget is classified as a data information gadget; if the content recorded on an information gadget corresponds to an instruction, the information gadget is classified as a functional information gadget. Based on the rules of the classification, the information gadgets 111, 112, 113 are data information gadgets, while the information gadget 114 is a functional information gadget. For each of the data information gadgets (i.e. the information gadgets 111, 112, 113), the database stored in the storage unit 14 stores at least one corresponding file.

Next, interactions provided by the interactive information system 1 are described. Each interaction of the interactive information system 1 begins from placing one or more of the information gadgets 111, 112, 113, . . . , 114 in a reading range of the reading apparatus 11. The interactive information system 1 functions differently when the numbers of the placed information gadgets is one and when it is more than one.

The scenario that one single information gadget is placed within the reading range of the reading apparatus 11 is described here. When an information gadget is placed within the reading range of the reading apparatus 11, the reading apparatus 11 reads an identifier of the information gadget and generate a signal related to the identifier. Meanwhile, the reading apparatus 11 continuously captures an image in real time, wherein the image comprises the information gadget and a scene in front of the reading apparatus 11. Then, the reading apparatus 11 transmits the signal and the captured images to the processing unit 13 via the first transmission interface 12. After receiving the signal and the captured images from the first transmission interface 12, the processing unit 13 identifies the information gadget indicated by the signal. In particular, the processing unit 13 identifies the information gadget by identifying the identifier on the information gadget, generates an identification (ID) code representing the information gadget. Then the processing unit 13 checks whether the database stored in the storage unit 14 stores a file corresponding to the ID code. If the database stores a file corresponding to the ID code, the processing unit 13 will retrieve the file according to the ID code, and transmit the file and the captured images to the output apparatus 16 via the second transmission interface 15. The output apparatus 16 subsequently displays the captured images along with the file in a user interface. The file may be an image file, a video file, an audio file or a combination thereof which records a piece of information relating to a knowledge field.

For example, assume that the information gadget 111 is placed within the reading range of the reading apparatus 11. The reading apparatus 11 reads the 2D barcode 111a of the information gadget 111 and transmits a signal 111g representing the 2D barcode 111a to the first transmission interface 12. The reading apparatus 11 continuously captures an image 121 in real time and transmits the captured images 121 to the first transmission interface 12, wherein the image 121 comprises the information gadget 111 and a scene in front of the reading apparatus 11. The processing unit 13 receives the signal 111g and the captured images 121 via the first transmission interface 12. Meanwhile, the processing unit 13 determines that there is only one information gadget within the reading range of the reading apparatus 11. After that, the processing unit 13 identifies an ID code 111h indicated by the signal 111g, retrieves a file 111i (for example, a video file showing the stroke order of the traditional Chinese character "愛" and a audio file showing the pronunciation of the traditional Chinese character "愛") from the database stored in the storage unit 14 according to the ID code 111h, and transmits the file 111i and the captured images 121 to the output apparatus 16 via the second transmission interface 15. After receiving the file 111i and the captured images 121 from the processing unit 13, the output apparatus 16 outputs the captured images 121 along with the file 111i (i.e. the display unit of the output apparatus 16 displays the image of English word "Love", and the speaker of the output apparatus 16 broadcasts the Chinese pronunciation which is "ai" of the Chinese character "愛") in a user interface. From the file 111i shown on the output apparatus 16, the user learns the stroke order and the pronunciation of the traditional Chinese character "愛".

When more than one information gadget is placed within the reading range of the reading apparatus 11 together, the processing unit 13 has to determine the number of groups formed by the placed information gadgets based on the distance between these placed information gadgets.

Assume that two information gadgets are placed within the reading range of the reading apparatus 11 together, the reading apparatus 11 reads the 2D barcodes of the placed information gadgets, and transmits signals that individually representing the 2D barcodes to the first transmission interface 12. Meanwhile, the reading apparatus 11 continuously captures an image in real time and transmits the captured images to the first transmission interface 12, wherein the image comprises the information gadgets and a scene in front of the reading apparatus 11. The processing unit 13 receives the signals and the captured images via the first transmission interface 12 and identifies the ID codes indicated by the signals. The processing unit 13 also determines that there are two information gadgets and the distance between the information gadgets is not shorter than the predetermined distance.

Since the distance between the information gadgets is not shorter than the predetermined distance, the processing unit 13 treats them separately (i.e. treats them as two groups). Consequently, for each of the ID codes, the processing unit 13 retrieves a file from the database stored in the storage unit 14 and then transmits the files and the captured images to the output apparatus 16 via the second transmission interface 15. After receiving the files and the captured images from the second transmission interface 15, the output apparatus 16 outputs the files and the captured images.

When the placed information gadgets form one group (i.e. the distance between the information gadgets is shorter than the predetermined distance), the processing unit 13 has to determine whether the group is a meaningful group or a meaningless group. Several concrete examples are given herein for better understanding. If the information gadget 112 is placed at the left of the information gadget 113, the group formed by them is meaningful because the Chinese phrase formed by them has the meaning of "having a meal." On the contrary, if the information gadget 113 is placed at the right of the information gadget 112, the group formed by them is meaningless. If the information gadget 112 is placed at the left of the information gadget 114, it is meaningful because there if one functional information gadget. An approach to determine whether a group is meaningful is described below.

Assume that there are two information gadgets being placed within the reading range of the reading apparatus 11. If the processing unit 13 determines that the distance between the information gadgets is shorter than the predetermined distance, the processing unit 13 will subsequently determine their order according to their relative positions. The processing unit 13 receives the signals representing the 2D barcodes of the information gadgets from the reading apparatus 11 and identifies the ID codes indicated by the signals. Afterwards, the processing unit 13 groups the two ID codes into a grouped ID code representing the combination of the information gadgets according to the order of the information gadgets, and determines whether the grouped ID code is a permissible grouped ID code. If the grouped ID code is a permissible grouped ID code, the group formed by the information gadgets is meaningful; otherwise, it is meaningless.

Here describes that how the processing unit 13 determines whether the grouped ID code is a permissible grouped ID code. Specifically, after the processing unit 13 grouped two ID codes into a grouped ID code, the processing unit 13 will further check whether the database stored in the storage unit 14 stores a file corresponding to the grouped ID code. If yes, the processing unit 13 determines that the grouped ID code is a permissible grouped ID code. If the database does not store a file corresponding to the grouped ID code, the processing unit 13 determines that the grouped ID code is not a permissible grouped ID code.

When the grouped ID code is impermissible, the processing unit 153 will retrieve an erroneous message 100 from the database stored in the storage unit 14 and then transmit the erroneous message 100 to the output apparatus 16 via the second transmission interface 15. After receiving the erroneous message 100 from the second transmission interface 15, the output apparatus 16 outputs the erroneous message 100. From the erroneous message 100 shown on the output apparatus 16, the user can learn that the group formed by the information gadgets is meaningless.

If the processing unit 13 determines that the grouped ID code is a permissible grouped ID code, the processing unit 13 will subsequently retrieve a file corresponding to the permissible grouped ID code from the database stored in the storage unit 14 and then transmit the file to the output apparatus 16 via the second transmission interface 15. After receiving the file corresponding to the permissible grouped ID code from the second transmission interface 15, the output apparatus 16 outputs the file so that the user can learn the meaning of the grouped information gadgets.

Several examples are given herein to describe the detailed operations of the interactive information system 1 when more than one information gadget is placed with in the reading range of the reading apparatus 13.

A first example is that the information gadgets 112, 113 enter the reading range of the reading apparatus 11 together. The reading apparatus 11 reads the 2D barcode 112a, 113a and transmits signals 112g, 113g respectively corresponding to the 2D barcode 112a, 113a to the first transmission interface 12. Meanwhile, the reading apparatus 11 continuously captures an image 122 in real time and transmits the captured images 122 to the first transmission interface 12, wherein the image 122 comprises the information gadget 112, 113 and a scene in front of the reading apparatus 11. The processing unit 13 receives the signals 112g, 113g and the captured images 122 via the first transmission interface 12. Then, the processing unit 13 determines that there are two information gadgets and then determines whether the distance between the information gadgets 112, 113 is shorter than a predetermined distance. If the distance between the information gadgets 112, 113 is not shorter than a predetermined distance, the processing unit 13 will process them separately. Specifically, the processing unit 13 identifies an ID code 112h, for example 0x330 indicated by the signal 112g and an ID code 113h, for example 0x332, indicated by the signal 113g. Then, the processing unit 13 retrieves a first file 112i (for example, an animation showing the stroke order of the Chinese character "吃") and a second file 113i (for example, an animation showing the stroke order of the Chinese character "飯") respectively according to the ID code 112h and the ID code 113h from the database stored in the storage unit 14. The processing unit 13 then transmits the files 112i, 113i and the captured images 122 to the output apparatus 16 via the second transmission interface 15. After receiving the files 112i, 113i and the captured images 122 from the second transmission interface 15, the output apparatus 16 individually outputs the captured images 122 along with the files 112i, 113i in a user interface, i.e. the display unit individually displays the animations showing the stroke order of the Chinese character "吃" and the stroke order of the Chinese character "飯".

If the processing unit 13 determines that the distance between the information gadgets 112, 113 is shorter than a predetermined distance, the processing unit 13 will subsequently determine the order of the information gadgets 112, 113 according to their relative positions. The first situation to be discussed is that the information gadget 113 is placed at the left of the information gadget 112. In this situation, the processing unit 13 determines that the order of the information gadgets 113, 112 is that the information gadgets 113 is prior to the information gadget 112, which means the ID code 113h is prior to the ID code 112h. The processing unit 153 the forms a grouped ID code 120h (for example, 0x332–0x330) according to the order of the ID codes 112h, 113h (i.e. the order of the information gadgets 112, 113). After the generation of the grouped ID code 120h, the processing unit 13 determines whether the grouped ID code 120h is a permissible grouped ID code. In this example, the grouped ID code 120h is not a permissible grouped ID code (i.e. the database stored in the storage unit 14 does not store a file corresponding to the grouped ID code). Therefore, the processing unit 153 retrieves an erroneous message 100 according to the impermissible grouped ID code 120h from the database stored in the storage unit 14 and then transmits the erroneous message 100 and the captured images 122 to the output apparatus 16 via the second transmission interface 15. After receiving the erroneous message 100 and the captured images 122 from the second transmission interface 15, the output apparatus 16 outputs the captured images 122 along with the erroneous message 100 in a user interface. According to the erroneous message 100 shown on the output apparatus 16, a user can learn that placing the information gadget 113 at the left of the information gadget 112 is invalid, i.e. the Chinese phrase "飯吃" is meaningless.

If the information gadget 112 is placed at the left of the information gadget 113, the processing unit 13 will determine that the order of the information gadget 112, 113 is that the information gadget 112 is prior to the information gadget 113, which means the ID code 112h is prior to the ID code 113h. The processing unit 13 then forms a grouped ID code 121h (for example, 0x330–0x332) and determines that the grouped ID code 121h is a permissible grouped ID code (i.e. the database stored in the storage unit 14 stores a file corresponding to the grouped ID code). Next, the processing unit 13 retrieves a file 121i (for example, an explanation of the Chinese phrase "吃飯") from the database stored in the storage unit 14 according to the permissible grouped ID code 121h and then transmits the file 121i and the captured images 122 to the output apparatus 16 via the second transmission interface 15. After receiving the learning material 121i and the captured images 122 from the second transmission interface 15, the output apparatus 16 outputs the captured images 122 along with the file 121i (i.e. the explanation of the Chinese phrase "吃飯") in a user interface.

Here is another example. Assume that the information gadgets 112, 114 are placed within the reading range of the reading apparatus 13 together. In the same way, the reading apparatus 11 reads the 2D barcodes 112a, 114a and transmits the signals 112g, 114g respectively representing the 2D barcodes 112a, 114a to the first transmission interface 11. The processing unit 13 receives the signals 112g, 114g via the first transmission interface 11 and identifies the ID codes 112h, 114h respectively indicated by the signals 112g, 114g. Meanwhile, the processing unit 13 determines that the distance between the information gadgets 112, 114 is shorter than a predetermined distance, and a grouped ID code is formed. The processing unit 13 further determines that the grouped ID code is a permissible ID code, then the processing unit 13 retrieves a file 114i corresponding to the grouped ID code from the database stored in the storage unit 14 according to the grouped ID code. Since the information gadgets 114 representing pronunciation, the file 114i is a audio of the traditional Chinese character "吃". The processing unit 13 then transmits the file 114i to the output apparatus 16. Since the output apparatus 16 comprises a speaker, then it is able to play the learning material 114i (i.e. the audio).

In addition to perform the operating with the information gadgets, the interactive information system 1 may further download a learning material from a Web server. In this case, the processing unit 13 of the interactive information system 1 is further connected to a Web server directly or through a network (not shown in figures). The processing unit 13 receives a learning material from the Web server and transmits the learning material to the to the output apparatus 16 via the second transmission interface 15. From this manner, a user may get more information from the interactive information system 1 which supplied by the Web server and will not be limited to the information gadgets. Furthermore, the processing unit 13 of the interactive information system 1 may further record a learning result related to the learning material received from the Web server and transmit the learning result to the Web server for tracking a learning progress of a user.

The above descriptions are used to illustrate how the information gadgets interact with the interactive information system 1; however, before using the interactive information system 1, it may need an authentication procedure. After pass through the authentication procedure, a use may be authorized to begin the interactions provided by the interactive information system. In this case, the processing unit 13 of the interactive information system 1 is further connected to an authentication server directly or through a network (not shown in figures). The authentication procedure begins with an activation gadget which being record with an ID code related to a piece of authentication information. How interactive information system 1 executes the authentication procedure will be described hereafter.

The reading apparatus 11 read the ID code of the activation gadget and generate an activation signal related to the ID code of the activation gadget. Then, the reading apparatus 11 transmits the activation signal to the processing unit 13 via the first transmission interface 12. After receiving the activation signal from the first transmission interface 12, the processing unit 13 identifies the ID code indicated by the activation signal and executes an activation procedure with the authentication server. After passing through the activation procedure, the authentication server will transmit a correct message to the processing unit 13, and processing unit 13 will transmit the correct message to the output apparatus 16 via the second transmission interface 15. From the correct message shown on the output apparatus 16, a user knows that the interactive information system 1 is ready for use.

Figure 1G:
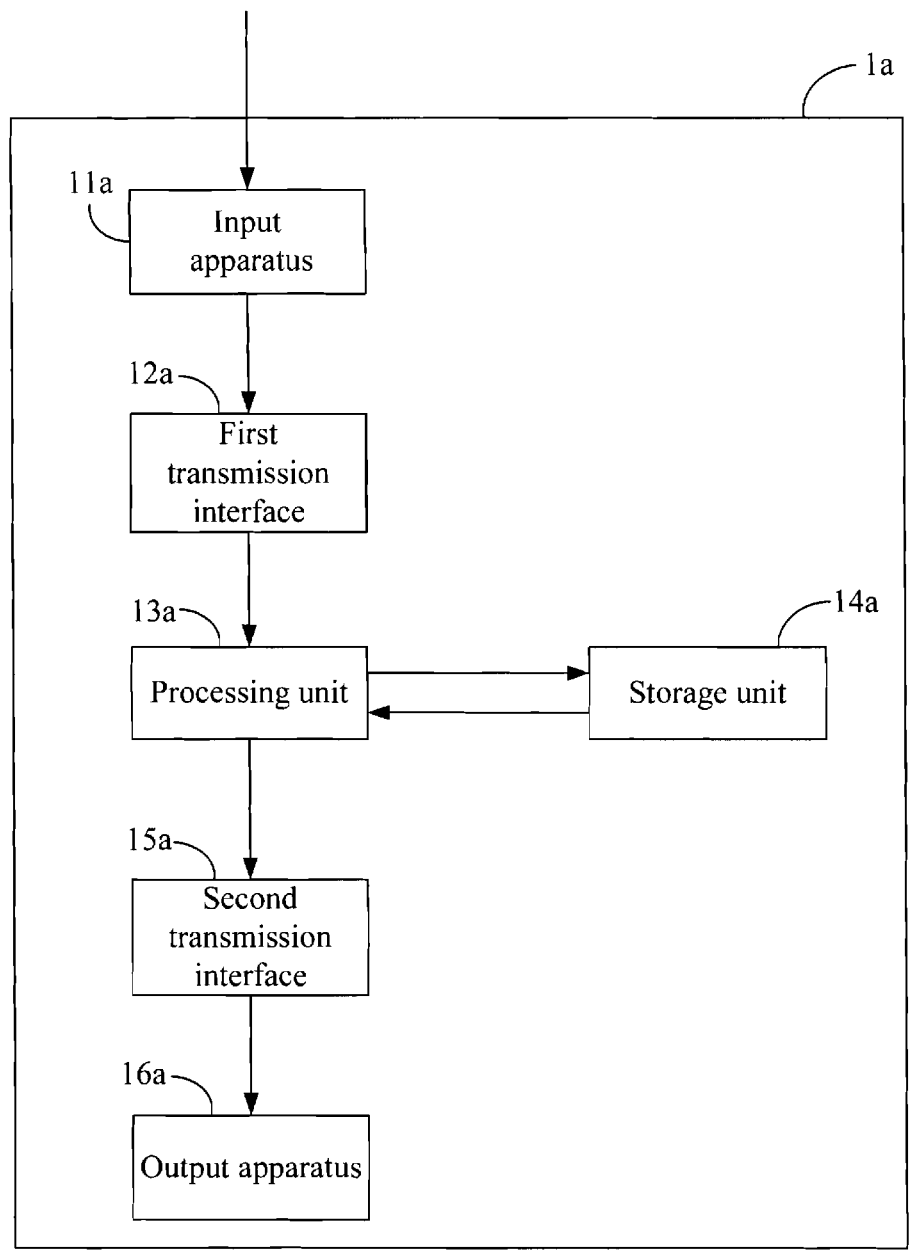
FIG. 1G illustrates a schematic view of a second embodiment of the present invention.

A second embodiment of the present invention is an interactive information system 1a, whose schematic view is illustrated in FIG. 1G. The interactive information system 1a is the same as the interactive information system 1 except that the reading apparatus 11 is replaced by an input apparatus 11a. Therefore, the composition of the interactive information system 1a and the connection between each element of the interactive information system 1a will not be further described herein.

The input apparatus 11a can be controlled by a user. When the user use the input apparatus 11a to perform a selection, the input apparatus 11a will generate a signal related to the selection. In this embodiment, the input apparatus 11a is a mouse. In other embodiment may be replaced by a touch panel or other apparatus that can receive an instruction from a user.

Figure 1H:
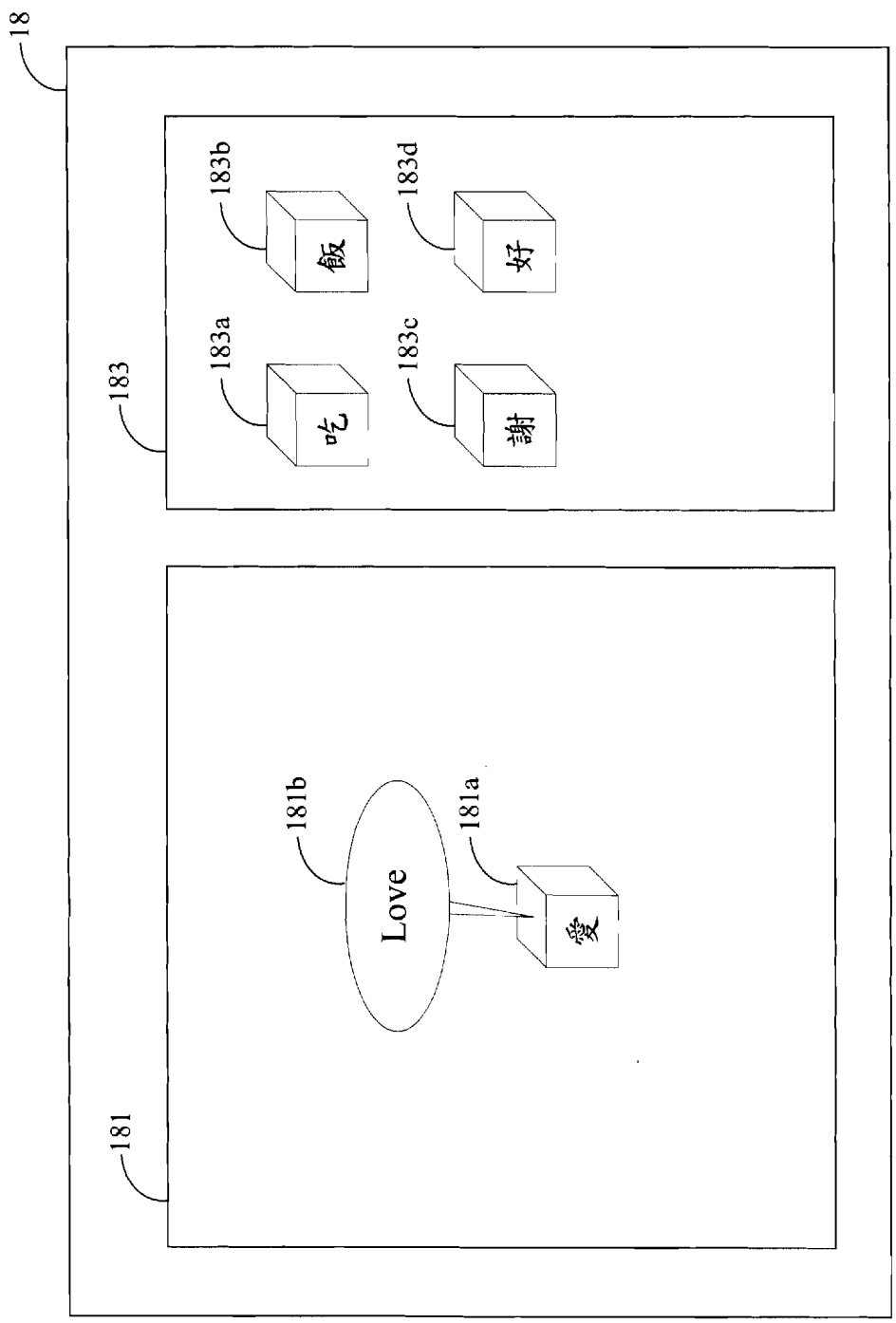
FIG. 1H illustrates an example of the second embodiment of the present invention.

Here describes the differences between the first embodiment and the second embodiment. In the second embodiment, the output apparatus 16 is a display unit, the information gadget is displayed on the display unit beginning from a time before the user uses the input apparatus to achieve a selection. FIG. 1H illustrates an example of a frame 18 displayed by the display unit in the second embodiment. The frame 18 comprises a first sub-frame 181 for displaying the selected information gadgets and a second sub-frame 183 for displaying a plurality of information gadgets for selection. Specifically, the display unit displays a plurality of information gadgets (i.e. the information gadget 183a, 183b, 183c, and 183d) as a menu bar for selection. When a user uses the input apparatus 11a to select at least one information gadget, the input apparatus 11a generates a signal related to the selection. In this embodiment, assume that the user selects a first information gadget by using a mouse (i.e. the input apparatus 11a). The input apparatus 11a will generate a signal related to the selection. The processing unit 13a then receives the signal via the first transmission interface 12a. In this example, the information gadget 181a is selected and displayed within the first sub-frame 181.

After receiving the signal from the first transmission interface 12a, the processing unit 13a identifies an ID code indicated by the signal, wherein the ID code representing the first information gadget. The processing unit 13a then retrieves a first file corresponding to the ID code from the storage unit 14a. In this example, the first file is the image file 181b as displayed within the first sub-frame 181 which shows the meaning of the information gadget 181a.

The following operations and functions are the same as the first embodiment. How the second embodiment executes these operations and functions will be readily appreciated by those of ordinary skill in the art based on the explanation of the first embodiment, and thus will not be further described herein.

Figure 2:
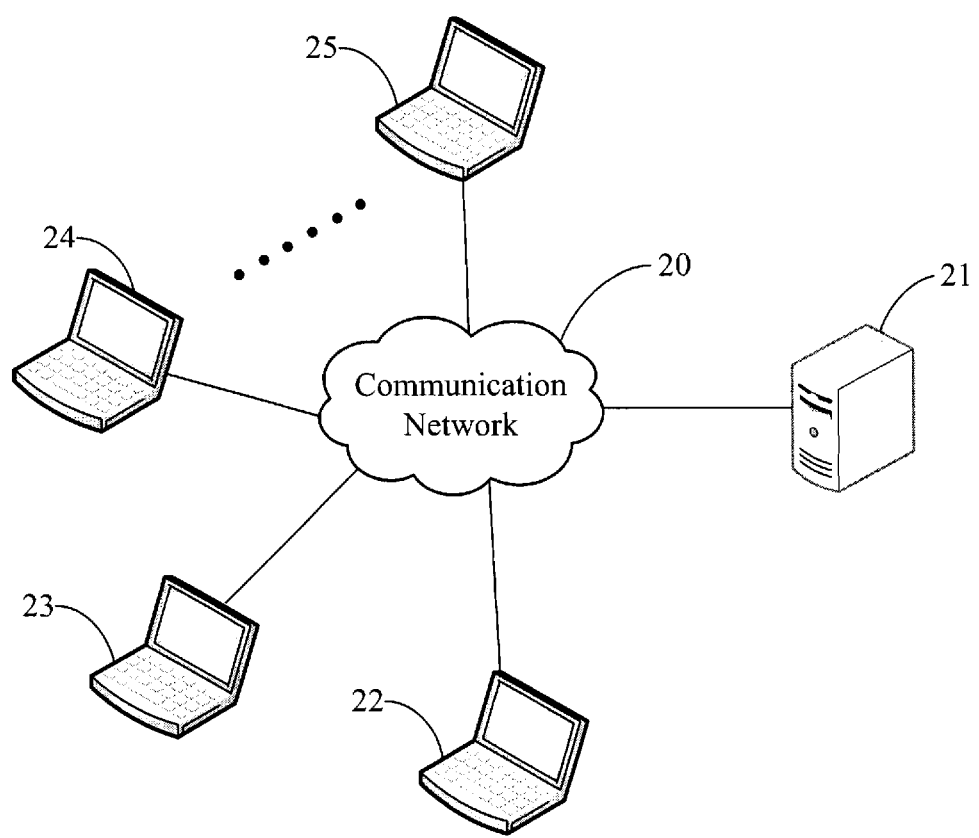
FIG. 2 illustrates a schematic view of a third embodiment of the present invention.

A third embodiment of the present invention is an interactive information network 2, whose schematic view is illustrated in FIG. 2. The interactive information network 2 comprises a communication network 20, a server 21, and a plurality of user terminals 22, 23, 24, 25 and they are connected via the communication network 20 in a wired way or in a wireless way. In this embodiment, the communication network 20 is Internet; however, it may be replaced by other network in other embodiments. Each of the user terminals 22, 23, 24 comprises a reading apparatus and an output apparatus, such as the reading apparatus 11 and the output apparatus 16 in the first embodiment. The server 21 comprises a first transmission interface, a second transmission interface, a processing unit, and a storage unit as the interactive information system 1 of the first embodiment.

When an information gadget enter the reading range of the reading apparatus of the user terminal 22, the reading apparatus of the user terminal 22 reads the 2D barcode on the information gadget and transmits a signal representing the 2D barcode to the server 21. The processing unit of the server 21 receives the signal via the communication network 20. After receiving the signal from the user terminal 22, the processing unit of the server 21 identifies an ID code indicated by the signal. Then, the processing unit of the server 21 retrieves a file according to the ID code from the storage unit of the server 21 and transmits the file to the user terminal 22 via the communication network 20. After receiving the file from the server 21, the output apparatus of the user terminal 22 outputs the file.

In addition to the interaction between the server 21 and the user terminal 22, interaction may also be constructed between the user terminal 22 and the user terminal 23. More details are given below. After the reading apparatus of the user terminal 22 reads the 2D barcode of an information gadget and transmits a signal representing the 2D barcode to the server 21, the processing unit of the server 21 receives the signal and identifies the ID code indicated within the signal. The processing unit of the server 21 then retrieves a file corresponding to the ID code from the database stored in the storage unit of the server 21. Then, the processing unit of the server 21 transmits the file to the user terminal 22 and the user terminal 23 via the communication network 20. After receiving the file from the server 21, the output apparatus of the user terminal 22 and the output apparatus of the user terminal 23 output the file.

From the above descriptions, people skilled in the art can realize that the interactions can happened between any two apparatuses of the interactive information network 2, so the details are not repeated. In addition to the aforesaid functions, the server 21 can execute all the operations and functions of the interactive information system 1 set forth in the first embodiment. How the server 21 of second embodiment executes these operations and functions will be readily appreciated by those of ordinary skill in the art based on the explanation of the first embodiment, and thus will not be further described herein.

FIGS. 3A-3E depict a fourth embodiment of this invention, which is an interactive information method adapted for use in an interactive information system, e.g., the interactive information system 1 described in the first embodiment. More specifically, the signal transmission method of the fourth embodiment may be implemented by a computer program product. When the computer program product is loaded in a computer and a plurality of instructions contained therein is executed, the signal transmission method of the third embodiment will be accomplished. This computer program product may be stored in a tangible machine-readable medium, such as an ROM, a flash memory, a floppy disk, a hard disk, a compact disk, a mobile disk, a magnetic tape, a database accessible to networks, or any other storage media with the same function and well known to those skilled in the art.

The interactive information method of the third embodiment comprises the following steps. First, step 301 is executed to enable the reading apparatus to read an information gadget (or information gadgets) and generate a signal related to the information gadget(s) when the information gadget(s) enters the reading range of the reading apparatus and step 302 is executed to enable the reading apparatus to continuously capture an image of a scene in front of the reading apparatus in real time and transmits the signal and the captured images to the processing unit. Next, step 303 is executed to enable the processing unit to receive the signal and the captured images from reading apparatus via the first transmission interface and step 304 is executed to enable the processing unit to identify the ID code(s) indicated by the signal. After step 304, step 305 is executed to enable the processing unit to determine whether the number of the information gadgets is greater than one.

Figure 3A:
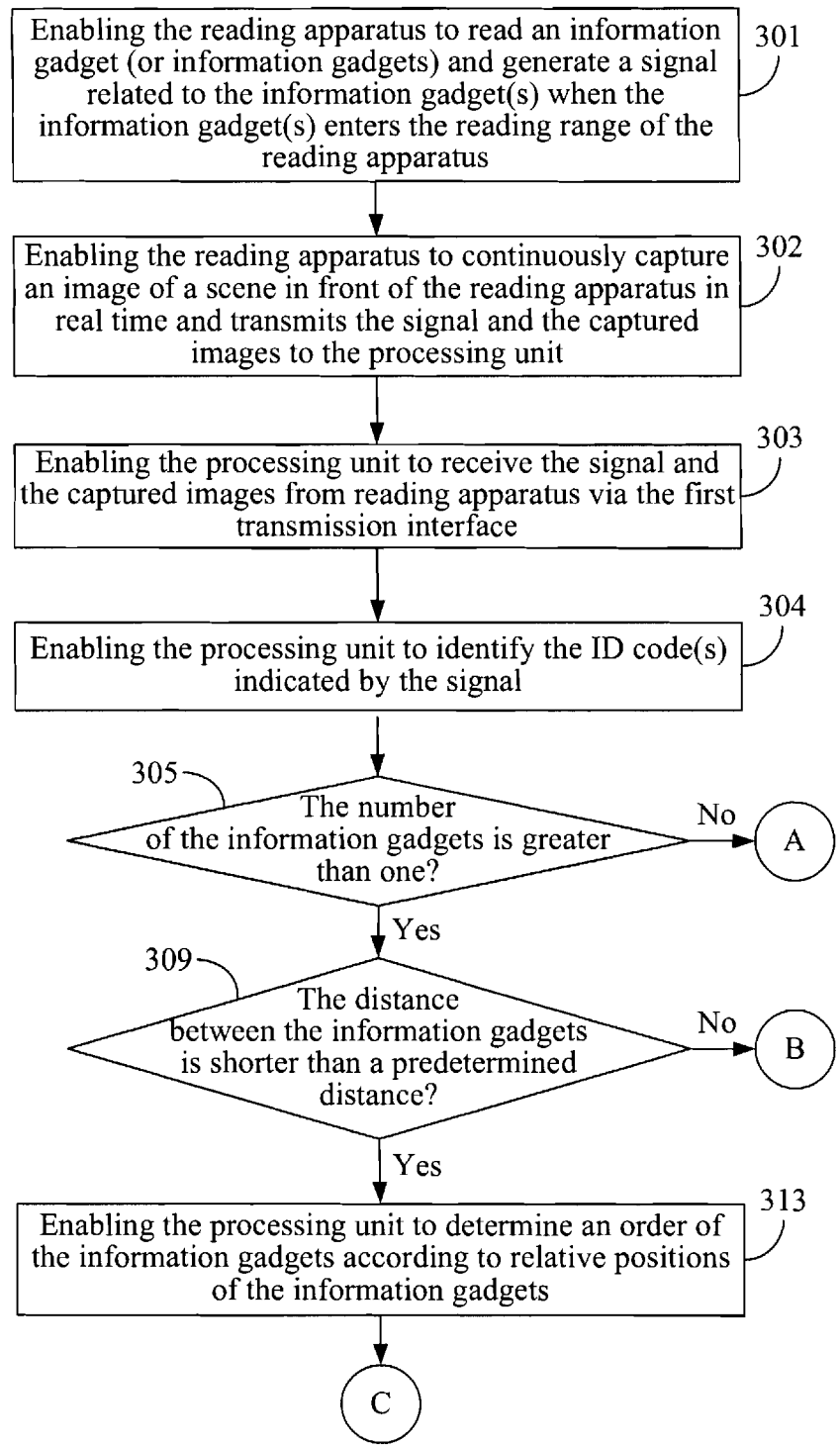
FIGS. 3A-3E are the flowcharts of a fourth embodiment of the present invention.
Figure 3B:
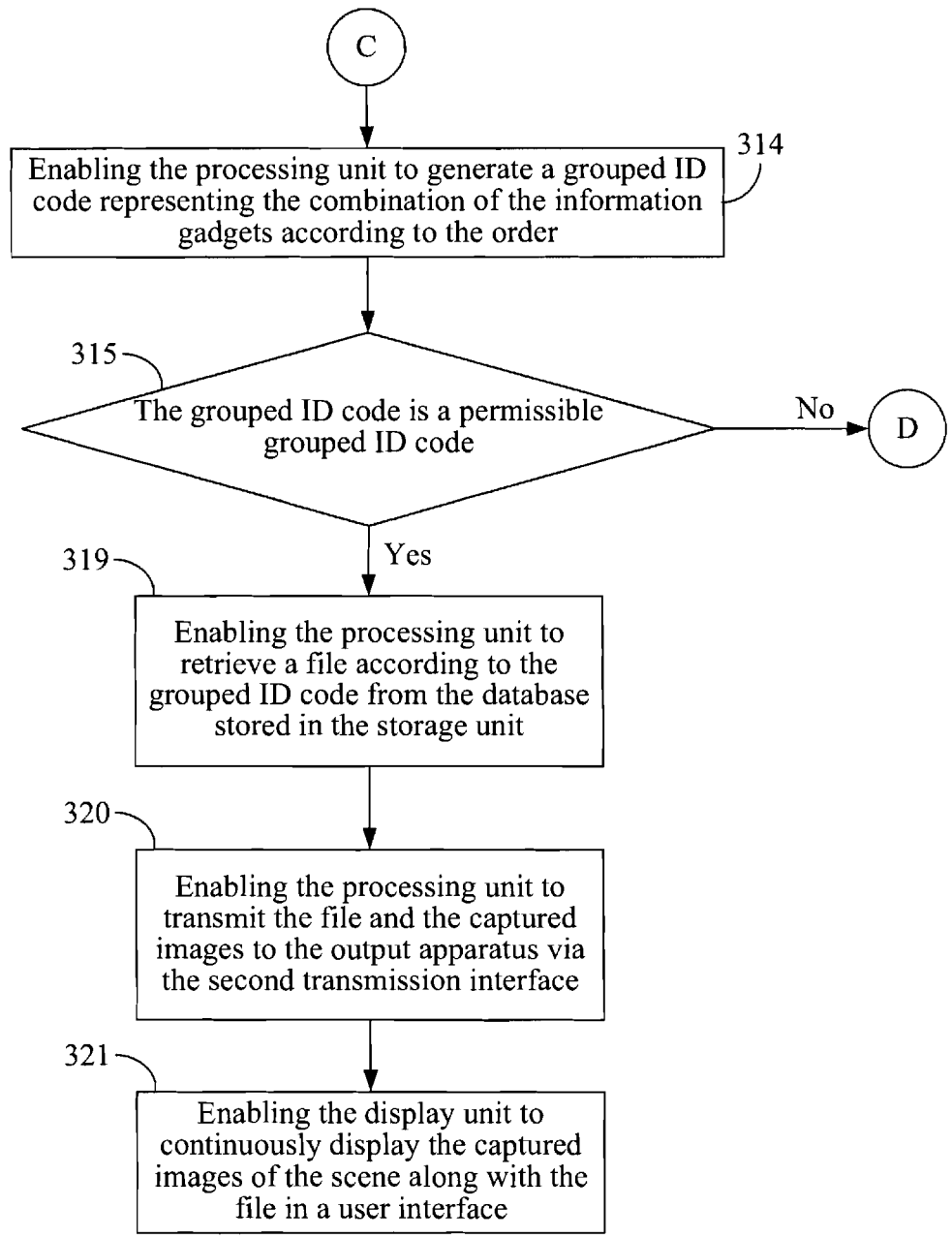
Figure 3C:
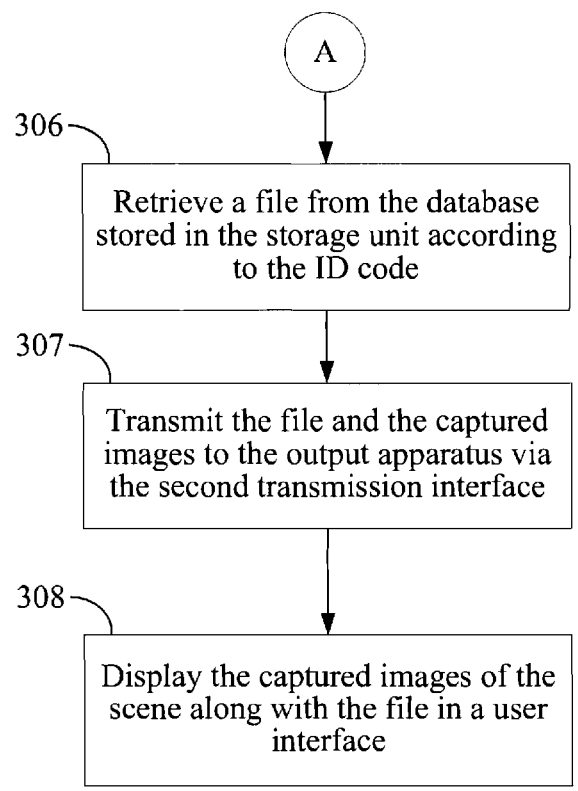
Figure 3D:
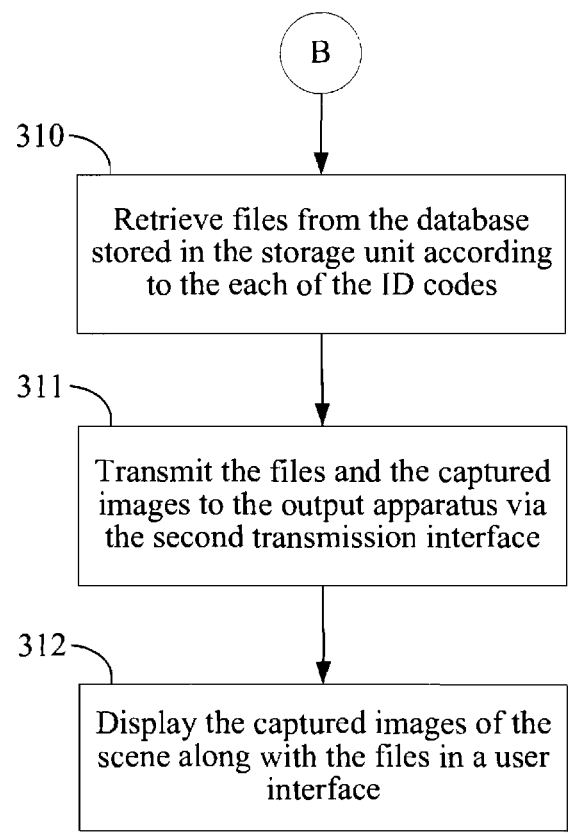
Figure 3E:
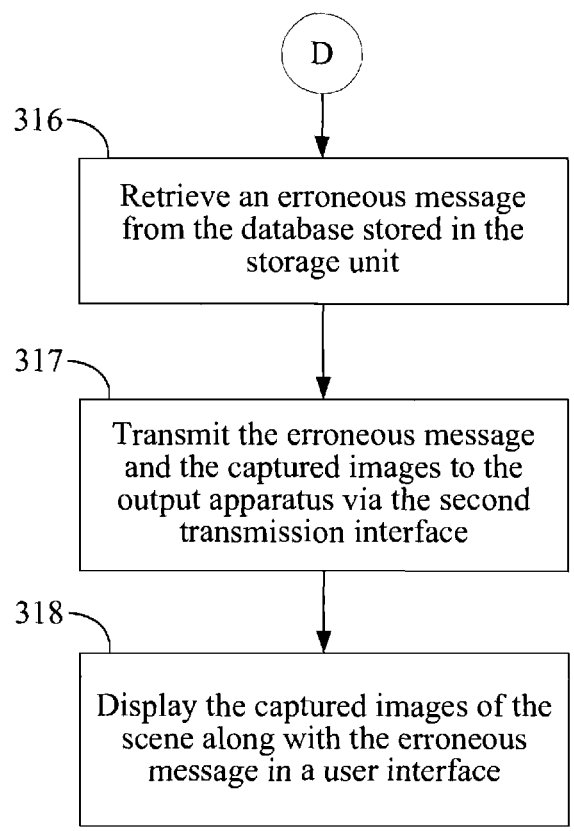

If it is no in step 305, please refer to FIG. 3C for the steps to be executed. Step 306 is executed to enable the processing unit to retrieve a file from the database stored in the storage unit according to the ID code. Then, step 307 is executed to enable the processing unit to transmit the file and the captured images to the output apparatus via the second transmission interface. Finally, step 308 is executed to enable the display unit to continuously display the captured images of the scene along with the file in a user interface.

If the result determined in step 305 is that the number of information gadgets is greater than one, step 309 is executed to enable the processing unit to further determine whether the distance between the information gadgets is shorter than a predetermined distance. If no, please refer to FIG. 3D for the following steps to be executed. Step 310 is executed to enable the processing unit to retrieve files from the database stored in the storage unit according to the each of the ID codes. Then, step 311 is executed to enable the processing unit to transmit the files and the captured images to the output apparatus via the second transmission interface. Finally, step 312 is executed to enable the display unit to continuously display the captured images of the scene along with the files in a user interface.

If it is yes in step 309, step 313 is executed in the next to enable the processing unit to determine an order of the information gadgets according to relative positions of the information gadgets. Please refer to FIG. 3B for the steps to be executed. Then, step 314 is executed to enable the processing unit to generate a grouped ID representing the combination of the information gadgets according to the order. Next, step 314 is executed to enable the processing unit to determine whether the grouped ID code is a permissible grouped ID code. If no, please refer to FIG. 3E for the following steps to be executed. Step 316 is executed to enable the processing unit to retrieve an erroneous message from the database stored in the storage unit. Then, step 317 is executed to enable the processing unit to transmit the erroneous message and the captured images to the output apparatus via the second transmission interface. Finally, step 318 is executed to enable the display unit to continuously display the captured images of the scene along with the erroneous message in a user interface.

In step 315, if the grouped ID code is determined as a permissible grouped ID code, step 319 is executed to enable the processing unit to retrieve a file according to the grouped ID code from the database stored in the storage unit. Then, step 320 is executed to enable the processing unit to transmit the file and the captured images to the output apparatus via the second transmission interface. Finally, step 321 is executed to enable the display unit to continuously display the captured images of the scene along with the file in a user interface.

In addition to the aforesaid steps, the fourth embodiment can also execute all the operations and functions set forth in the first, second, and third embodiments. How the fourth embodiment executes these operations and functions will be readily appreciated by those of ordinary skill in the art based on the explanation of the first, second, and third embodiments, and thus will not be further described herein.

According to the above description, when the processing unit receives ID code (such as 2D barcodes) from the reading apparatus, the processing unit will retrieve a file corresponding to the information gadget(s) from the database stored in the storage unit and transmit the file to the output apparatus. Then, the output apparatus will output the file received from the processing unit. In this way, the prevent invention overcomes the drawbacks of the prior art (i.e. the conventional information exchange systems lack interactivity and interest).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An interactive information system, comprising:
   a first transmission interface being configured to receive a signal;
   a storage unit being configured to store a database;
   a processing unit being electrically connected to the first transmission interface and the storage unit and configured to receive the signal from the first transmission interface to identify a first information gadget indicated by the signal and to retrieve a first file according to the first information gadget from the database;
   a second transmission interface being electrically connected to the processing unit and configured to transmit the first file; and
   an output apparatus being electrically connected to the second transmission interface and configured to receive the first file from the second transmission interface and to output the first file,
   wherein the output apparatus comprises a display unit and a speaker, the first file comprises a video part and an audio part, the display unit is configured to display the video part of the first file and an image of the first information gadget, and the speaker is configured to broadcast the audio part of the first file, wherein the signal is further related to a second information gadget and the processing unit is further configured to identify the second information gadget indicated by the signal and to determine that a number of the information gadgets is greater than one, and wherein the processing unit is further configured to determine that a distance between the first information gadget and the second information gadget is not shorter than a predetermined distance and to retrieve a second file according to the second information gadget, and the display unit is further configured to receive the second file from the processing unit and to display the second file and an image of the second information gadget.

2. The interactive information system as claimed in claim 1, wherein the first information gadget has an identifier and the processing unit:

identifies the first information gadget according to the identifier;

generates an identification (ID) code representing the first information gadget; and retrieves the first file according to the ID code.

3. The interactive information system as claimed in claim 1, further comprising:

a reading apparatus being electrically connected to the first transmission interface and configured to read the first information gadget and to generate the signal related to the first information gadget.

4. The interactive information system as claimed in claim 1, wherein the first information gadget is displayed on the display unit and the interactive information system further comprises:

an input apparatus being electrically connected to the first transmission interface and configured to generate the signal when the input apparatus selects the first information gadget displayed on the display unit.

5. The interactive information system as claimed in claim 3, wherein the reading apparatus is a Web cam, the reading apparatus is further configured to continuously capture an image of a scene in front of the reading apparatus in real time, and the display unit is further configured to continuously display the captured images of the scene along with the first file in a user interface.

6. The interactive information system as claimed in claim 1, wherein the processing unit is connected to a Web server and is further configured to receive a learning material from the Web server.

7. The interactive information system as claimed in claim 6, wherein the processing unit is further configured to record a learning result related to the learning material and to transmit the learning result to the Web server.

8. The interactive information system as claimed in claim 3, wherein the processing unit is connected to an authentication server, the reading apparatus is further configured to read an activation gadget and to generate an activation signal related to the activation gadget, and the processing unit is further configured to receive the activation signal from the reading apparatus, to identify the activation gadget indicated by the activation signal, and to execute an activation procedure with the authentication server.

9. An interactive information method for use in an interactive information system, the interactive information system comprising a first transmission interface, a storage unit, a processing unit, an output apparatus comprising a display unit and a speaker, and a second transmission interface, the storage unit storing a database, the processing unit being electrically connected to the first transmission interface and the storage unit, the second transmission interface being electrically connected to the processing unit, the interactive information method comprising the steps of:

(a) enabling the first transmission interface to receive a signal, wherein the signal is related to a second information gadget;

(b) enabling the processing unit to receive the signal from the first transmission interface;

(c) enabling the processing unit to identify a first information gadget indicated by the signal;

(d) enabling the processing unit to retrieve a first file according to the first information gadget from the database;

(e) enabling the second transmission interface to transmit the first file;

(f) enabling the output apparatus to receive the first file from the second transmission interface, the first file comprising a video part and an audio part;

(g) enabling the output apparatus to output the first file comprising the steps of:

(g1) enabling the display unit to display the video part of the first file and an image of the first information gadget and (g2) enabling the speaker to broadcast the audio part of the first file;

(h) enabling the processing unit to identify the second information gadget indicated by the signal;

(i) enabling the processing unit to determine that a number of the information gadgets is greater than one (j) enabling the processing unit to determine that a distance between the first information gadget and the second information gadget is shorter than a predetermined distance, (k) enabling the processing unit to determine an order of the information gadgets according to relative positions of the information gadgets; and (l) enabling the processing unit to generate a grouped ID code representing the combination of the first and second information gadgets according to the order;

wherein the processing unit retrieves the first file according to the grouped ID code.

10. The interactive information method as claimed in claim 9, wherein the first information gadget has an identifier, and the step (b) enables the processing unit to identify the first information gadget according to the identifier, the step (c) enables the processing unit to generate an ID code representing the first information gadget, and the step (d) enables the processing unit to retrieve the first file according to the ID code.

11. The interactive information method as claimed in claim 9, wherein the interactive information system further comprises a reading apparatus being electrically connected to the first transmission interface, and the interactive information method further comprises the step of: (m) enabling the reading apparatus to read the first information gadget; and (n) enabling the reading apparatus to generate the signal related to the first information gadget according to the result of the step (m).

12. The interactive information method as claimed in claim 9, wherein the interactive information system further comprises an input apparatus being electrically connected to the first transmission interface, and the interactive information method further comprises the steps of: (m) enabling the display unit to begin to display the first information gadget from a time before the step (a) is executed; and (n) enabling the input apparatus to generate the signal when the input apparatus selects the first information gadget displayed on the display unit.

13. The interactive information method as claimed in claim 11, wherein the reading apparatus is a Web cam, the interactive information method further comprises the steps of: (o) enabling the reading apparatus to continuously capture an image of a scene in front of the reading apparatus in real time; and (p) enabling the display unit to continuously display the captured images of the scene along with the first file in a user interface.

14. The interactive information method as claimed in claim 9, wherein the processing unit is connected to a Web server, the interactive information method further comprises the step of:
(m) enabling the processing unit to receive a learning material from the Web server.

15. The interactive information method as claimed in claim 14, further comprising the following step of:
(n) enabling the processing unit to record a learning result related to the learning material and to transmit the learning result to the Web server.

16. The interactive information method as claimed in claim 11, wherein the processing unit is connected to an authentication server, the interactive information method further comprises the steps of:
(o) enabling the reading apparatus to read an activation gadget and to generate an activation signal related to the activation gadget; and
(p) enabling the processing unit to receive the activation signal from the reading apparatus, to identify the activation gadget indicated by the activation signal, and to execute an activation procedure with the authentication server.

17. An interactive information system, comprising:
a first transmission interface being configured to receive a signal;
a storage unit being configured to store a database;
a processing unit being electrically connected to the first transmission interface and the storage unit and configured to receive the signal from the first transmission interface and to identify a first information gadget indicated by the signal and to retrieve a first file according to the first information gadget from the database;
a second transmission interface being electrically connected to the processing unit and configured to transmit the first file; and
an output apparatus being electrically connected to the second transmission interface and configured to receive the first file from the second transmission interface and to output the first file,
wherein the output apparatus comprises a display unit and a speaker, the first file comprises a video part and an audio part, the display unit is configured to display the video part of the first file and an image of the first information gadget, and the speaker is configured to broadcast the audio part of the first file
wherein the signal is further related to a second information gadget and the processing unit is further configured to identify the second information gadget indicated by the signal and to determine that a number of the information gadgets is greater than one, and
wherein the processing unit is further configured to determine that a distance between the first information gadget and the second information gadget is shorter than a predetermined distance, to determine an order of the first and second information gadgets according to a position of each of the first and second information gadget, and to generate a grouped ID code representing the combination of the first and second information gadgets according to the order, wherein the processing unit retrieves the first file according to the grouped ID code.

18. The interactive information system as claimed in claim 17, further comprising:
a reading apparatus, being electrically connected to the first transmission interface and configured to read the first information gadget and to generate the signal related to the first information gadget.

19. The interactive information system as claimed in claim 17, wherein the first information gadget is displayed on the display unit, and the interactive information system further comprises:
an input apparatus, being electrically connected to the first transmission interface and configured to generate the signal when the input apparatus selects the first information gadget displayed on the display unit.

20. The interactive information system as claimed in claim 18, wherein the reading apparatus is a Web cam, the reading apparatus is further configured to continuously capture an image of a scene in front of the reading apparatus in real time, and the display unit is further configured to continuously display the captured images of the scene along with the first file in a user interface.

21. The interactive information system as claimed in claim 17, wherein the processing unit is connected to a Web server and is further configured to receive a learning material from the Web server.

22. The interactive information system as claimed in claim 21, wherein the processing unit is further configured to record a learning result related to the learning material and to transmit the learning result to the Web server.

23. The interactive information system as claimed in claim 18, wherein the processing unit is connected to an authentication server, the reading apparatus is further configured to read an activation gadget and to generate an activation signal related to the activation gadget, and the processing unit is further configured to receive the activation signal from the reading apparatus, to identify the activation gadget indicated by the activation signal, and to execute an activation procedure with the authentication server.

* * * * *